United States Patent
Broome et al.

(10) Patent No.: US 7,486,426 B2
(45) Date of Patent: *Feb. 3, 2009

(54) TWO-DIMENSIONAL OPTICAL SCAN SYSTEM USING A COUNTER-ROTATING DISK SCANNER

(75) Inventors: Barry G. Broome, Carlsbad, CA (US); George Frangineas, Fremont, CA (US); Leonard C. DeBenedictis, Palo Alto, CA (US)

(73) Assignee: Reliant Technologies, Inc., Mountain View, CA (US)

(*) Notice: Subject to any disclaimer, the term of this patent is extended or adjusted under 35 U.S.C. 154(b) by 43 days.

This patent is subject to a terminal disclaimer.

(21) Appl. No.: 11/691,291

(22) Filed: Mar. 26, 2007

(65) Prior Publication Data

US 2007/0158424 A1     Jul. 12, 2007

Related U.S. Application Data (63) Continuation of application No. 10/914,860, filed on Aug. 9, 2004, now Pat. No. 7,196,831, which is a continuation-in-part of application No. 10/750,790, filed on Dec. 31, 2003, now Pat. No. 7,184,184.

(51) Int. Cl.
*G02B 26/08* (2006.01)
(52) U.S. Cl. .................. 359/201; 359/202; 359/204; 359/205; 359/206; 359/213; 359/214; 359/216
(58) Field of Classification Search .......... 359/201–202
See application file for complete search history.

(56) References Cited

U.S. PATENT DOCUMENTS

| | | | |
|---|---|---|---|
| 3,619,033 A | | 11/1971 | McMahon |
| 3,721,486 A | * | 3/1973 | Bramley ............ 359/201 |
| 4,113,367 A | | 9/1978 | Fritzler |
| 4,289,371 A | | 9/1981 | Kramer |
| 4,387,952 A | | 6/1983 | Slusher |
| 4,428,643 A | | 1/1984 | Kay |
| 4,585,297 A | | 4/1986 | Hamaguchi et al. |
| 4,923,262 A | | 5/1990 | Clay et al. |
| 5,018,803 A | | 5/1991 | Hecker et al. |
| 5,182,659 A | | 1/1993 | Clay et al. |
| 5,309,272 A | | 5/1994 | Harris |
| 5,906,609 A | | 5/1999 | Assa et al. |
| 6,436,094 B1 | | 8/2002 | Reuter |
| 6,436,127 B1 | | 8/2002 | Anderson et al. |

(Continued)

FOREIGN PATENT DOCUMENTS

CN     1432142 A     7/2003

OTHER PUBLICATIONS

Chinese Notification of 1st Office Action, CN 200480039511.9, Jul. 20, 2007, 31 pages.

(Continued)

*Primary Examiner*—James Phan
(74) *Attorney, Agent, or Firm*—Fenwick & West LLP (57) ABSTRACT

A counter-rotating disk scanner together with another scan mechanism provides two-dimensional optical scanner. The counter-rotating disk scanner includes counter-rotating scan disks that implement the scanning action as they rotate through an optical axis of the system.

22 Claims, 6 Drawing Sheets

U.S. PATENT DOCUMENTS

| | | |
|---|---|---|
| 6,483,595 B1 | 11/2002 | Yakovlev et al. |
| 6,951,558 B2 | 10/2005 | Angeley et al. |
| 7,184,184 B2 | 2/2007 | DeBenedictis et al. |
| 7,196,831 B2 | 3/2007 | Broome et al. |
| 2003/0216719 A1 | 11/2003 | DeBenedictis et al. |
| 2006/0151449 A1 | 7/2006 | Warner, Jr. et al. |

OTHER PUBLICATIONS

PCT International Search Report and Written Opinion, PCT/US06/05411, Sep. 20, 2007, 10 pages.

* cited by examiner

TWO-DIMENSIONAL OPTICAL SCAN SYSTEM USING A COUNTER-ROTATING DISK SCANNER

CROSS-REFERENCE TO RELATED APPLICATION(S)

This application is a continuation of U.S. patent application Ser. No. 10/914,860, "Two-Dimensional Optical Scan System Using a Counter-Rotating Disk Scanner," filed Aug. 9, 2004, which is a continuation-in-part of U.S. patent application Ser. No. 10/750,790, "High Speed, High Efficiency Optical Pattern Generator Using Rotating Optical Elements," filed Dec. 31, 2003 by Leonard C. DeBenedictis et al. The subject matter of all of the foregoing is incorporated herein by reference in their entirety.

BACKGROUND OF THE INVENTION

1. Field of the Invention

This invention relates generally to two-dimensional optical scanners, such as for use in displays. More particularly, this invention relates to two-dimensional optical scanners that use multi-faceted rotating scan disks.

2. Description of the Related Art

Two-dimensional optical scan systems can be used in a variety of applications. For example, they can be used to scan an optical beam over a specified area in order to generate a two-dimensional display. As another example, they can be used to scan the field of view of a detector (or detector array) over an external scene, thus allowing the detector to capture a two-dimensional image of the scene. In both of these examples, the optical system may be required to produce a high-resolution image, with short exposure periods and a large image area to be covered. As a result, the two-dimensional scanners used in these optical systems can be complex and/or costly.

For example, in the case of large screen HDTV displays that are suitable for projection use in conference rooms, the high screen resolution combined with short frame periods and high screen brightness levels typically results in complex and costly scan systems. One example design is described in Published U.S. Patent Application No. 2002/0050963, "Light Beam Display with Interlaced Light Beam Scanning" by Conemac and Ford. This HDTV display system uses a high performance polygon scanner to produce the horizontal line raster scan. Two high performance, interlaced galvanometer scanners are used in conjunction with two arrays of high intensity laser diode sources to produce the vertical field scan. The laser diode sources, galvanometer scanners and polygon scanner are carefully aligned and synchronized in time in order to generate the display.

As an example of electro-optical camera systems, cameras for the infrared spectrum have been designed based on a large variety of complicated opto-mechanical scan systems. Two examples are the internal-bowl-scanner and the pyramidal polygon scanner. However, the scan resolution of these devices is limited by the limited number of scan facets that can be placed on the scan mechanisms and by the limitations on numerical aperture (NA) imposed by the scanning facet geometries.

Thus, there is a need for improved two-dimensional optical scan systems, including those that are suitable for use in high-resolution (e.g., HDTV) display systems and/or high-resolution electro-optic imaging systems.

SUMMARY OF THE INVENTION

The present invention overcomes the limitations of the prior art by using a counter-rotating disk scanner in conjunction with another scan mechanism to provide two-dimensional optical scanning. The counter-rotating disk scanner scans along one direction and the other scan mechanism scans along a cross direction (usually, a perpendicular direction). The second scan mechanism could be another counter-rotating disk scanner, or it could be a more conventional scanner such as a galvanometer, piezo-electric or polygon scanner.

In one aspect of the invention, the counter-rotating disk scanner includes two scan disks. Each scan disk has a plurality of facets that rotate around a rotational axis. Facets on the first scan disk have corresponding facets on the second scan disk, and the two scan disks counter-rotate so that the corresponding facets are synchronized as they rotate through the optical axis of the overall optical system. The rotation of corresponding facets through the optical axis causes the scanning.

In one design, the rotational axes of the two scan disks are offset from each other and the optical axis of the system intersects the scan disks at a point located between the two rotational axes. The scan direction is approximately parallel to the tangential direction of the scan disks (i.e., approximately perpendicular to the line connecting the two rotational axes).

In one implementation, the facets on the scan disks include lenses and the lenses on corresponding facets have approximately the same optical power. Aberrations can be corrected in a number of ways. For example, the lenses can be aspheric, with the asphericity correcting "dynamic" aberrations introduced by rotation of the facets through the optical axis. Furthermore, a separate lens group can correct for optical power and/or aberrations introduced by the facets. One advantage of a design based on counter-rotating scan disks is that corresponding facets can be designed to introduce scan line bows that counteract each other, so the net bow is significantly reduced. Another advantage is that the scan disks can be rotated at high speeds.

These types of two-dimensional scan systems can be used in a number of applications. For example, an incident optical beam (or array of optical beams) can be scanned to produce a display. In one design, a counter-rotating disk scanner generates the fast scan (e.g., a horizontal line raster scan) and a galvanometer scanner generates the slow scan (e.g., a vertical field scan). In the direction of propagation for the optical beam, the system includes the galvanometer scanner, a pre-scanner lens group, the disk scanner and a post-scan imaging lens group (e.g., an F-θ lens group). The pre-scanner lens group accepts optical beams at different incident angles, due to scanning of the galvanometer scanner. It also corrects for optical power and aberrations introduced by the facets on the disk scanner. The facets themselves may be aspheric, for example to correct for dynamic aberrations introduced by rotation of the facets through the optical beam. The post-scan imaging lens group can also correct for some of these dynamic aberrations.

Another example of a display includes a polygon scanner, a pre-scanner lens group, a counter-rotating disk scanner and a post-scan imaging lens group. In this example, the polygon scanner implements the fast scan and the disk scanner implements the slow scan. The pre-scanner lens group and post-scan imaging lens group can perform similar functions as in the previous example.

As a final example, the two-dimensional scan system can also be used "in reverse." Rather than scanning an incident optical beam, the scan system can be used to scan the field of view of a detector, thus allowing two-dimensional image capture. Other aspects of the invention include methods and applications corresponding to the devices and systems described above.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1A:
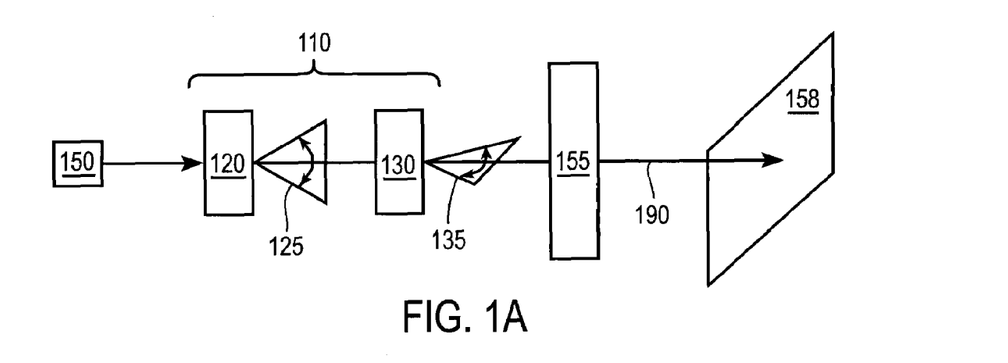
FIG. 1A is a block diagram of a display that uses a two-dimensional scan system according to the invention.
Figure 1B:
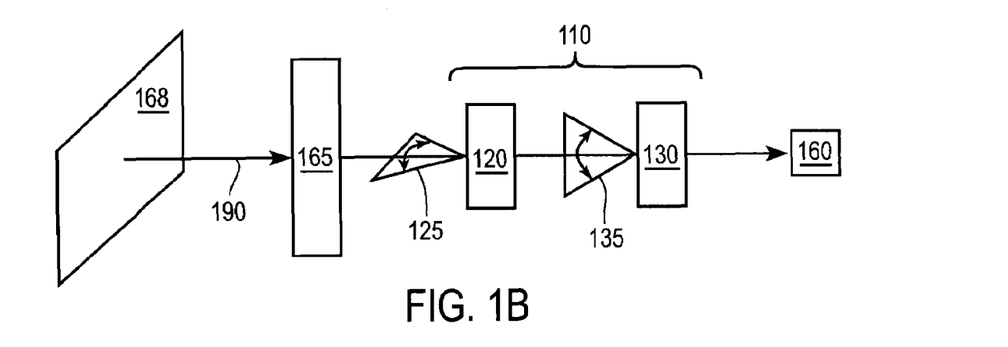
FIG. 1B is a block diagram of an imaging system that uses a two-dimensional scan system according to the invention.

FIGS. 1A-1B are block diagrams of two optical systems that use a two-dimensional scan system 110 according to the invention. In the display of FIG. 1A, an optical source 150 produces one or more optical beam(s) that are imaged by the imaging system 155 onto a display surface 158. The optical train of this system also includes a two-dimensional scan system 110 that scans the optical beam(s) to produce the displayed image. In the imaging system of FIG. 1B, an exterior scene 168 is imaged by the imaging system 165 onto a detector (or detector array) 160. The two-dimensional scan system 110 scans the field of view of the detector 160 over the scene 168 in order to capture the two-dimensional image.

In both of these examples, the two-dimensional scan system 110 includes a counter-rotating disk scanner 120 and a second scan mechanism 130. The disk scanner 120 implements the scan along one direction 125 and the other scan mechanism 130 implements the scan along a cross direction 135. The two scan directions are usually approximately perpendicular but they can intersect at other angles (e.g., 60 degrees) depending on the application. Examples of other scan mechanisms include galvanometer scanners, piezo-electric scanners and polygon scanners. Other examples might include acousto-optic scanners or scanners based on diffractive or holographic optics. Another counter-rotating disk scanner can also be used as the second scan mechanism 130.

FIGS. 1A-1B are simplified diagrams. The systems may include additional optics located anywhere along the optical axis 190 for shaping and/or directing the optical beam(s). The orders of the different components may also be changed. For example, the order of the disk scanner 120 and the second scan mechanism 130 may be interchanged. Alternately, the imaging systems 155, 165 may include components that are interspersed among the scanners 120, 130 and/or the source/detector 150/160. For convenience, the phrase "scanning the optical axis" will be used to refer to scanning in any type of application. It includes scanning an incident optical beam, as shown in FIG. 1A, as well as scanning the field of view of some other element, as shown in FIG. 1B.

Figure 2A:
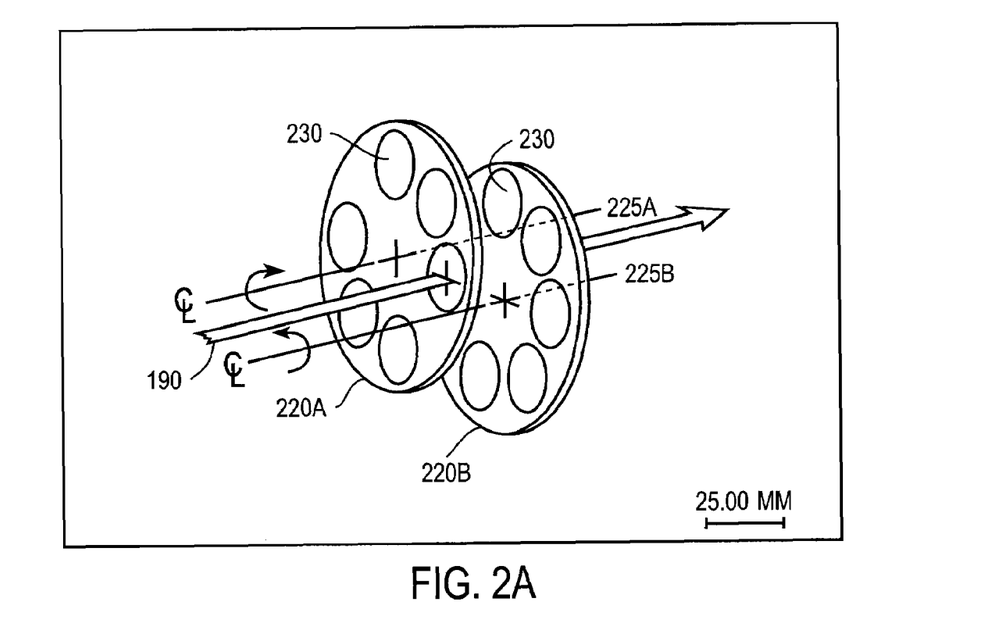
FIG. 2A is a perspective view of one example of a counter-rotating disk scanner.
Figure 2B:
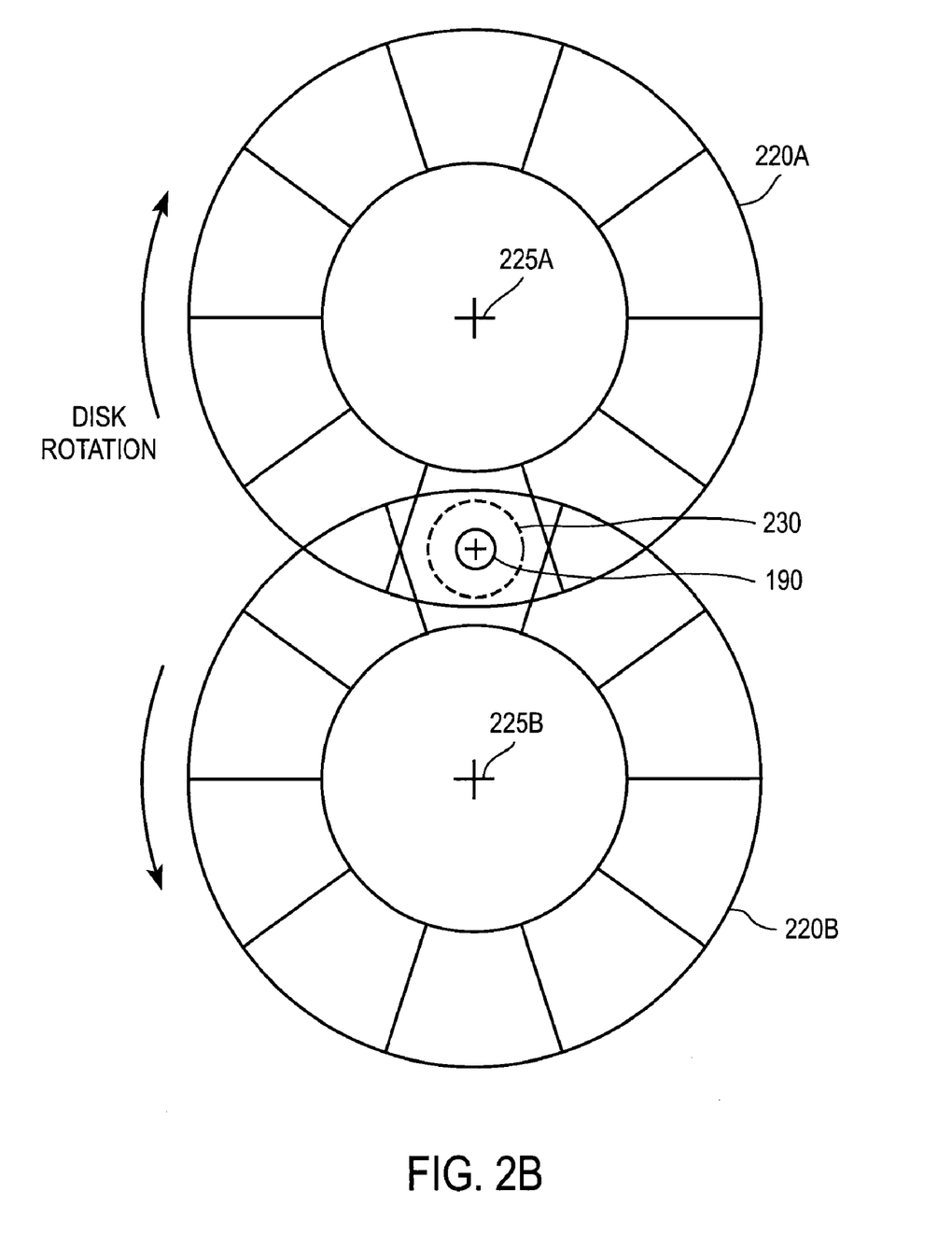
FIG. 2B is a top view of the disk scanner of FIG. 2A.
Figure 2C:
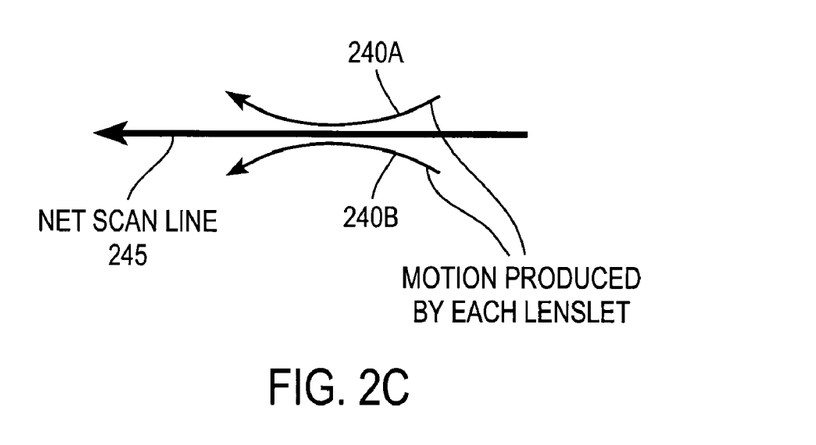
FIG. 2C is a diagram illustrating bow correction in the disk scanner of FIG. 2A.

FIGS. 2A-2C show an example of a counter-rotating disk scanner. The disk scanner includes two disks 220A-220B that are counter-rotating. Each disk 220 has a number of facets 230, which are represented by circles in FIGS. 2A and 2B. The circle shape does not imply that the facets 230 must be physically circular. For example, they may be shaped like truncated wedges as shown in FIG. 2B. The facets on one disk 220A have corresponding facets on the other disk. The rotation of the disks 220 is synchronized so that corresponding facets rotate through the optical axis 190 in synchronization. The optical axis 190 is scanned as the corresponding facets together rotate through the beam. For convenience, the portion of each facet that produces the scanning shall be referred to as the scan component of the facet.

FIGS. 2B-2C illustrate how facets can be designed so that their radial scan effects cancel. A scan component on a single scan disk will generally introduce a bow in the scan line as it rotates through the incident optical beam. In FIGS. 2B-2C, while the scan component on each scan disk may introduce a bow, the two scan components are designed so that the different bows counteract each other and the overall bow is reduced or eliminated.

One example of a scan component is a lens. When the lens is centered with the optical axis 190, the axis will not be deflected. However, as the lens rotates through the incident optical beam, the off-center lens will produce a change in ray direction proportional to the amount of decenter. That is, $\Delta\theta = \delta x/f$ where $\Delta\theta$ is the change in ray direction, $\delta x$ is the amount of decenter and f is the focal length of the lens. Thus, a scan line can be created by moving a lens through an optical axis.

Assume for the moment that there is only one scan disk 220A, that the optical axis 190 is normally incident to the scan disk 220A and that the scan component of the current facet has the same optical effect as a lens with negative optical power (positive power lenses can also be used), as represented by the circle 230. The circle representation is not meant to imply that the scan component must be circular in shape. For example, it may have the same shape of the facet. The optical axis is aligned with the center of the circle 230. As the facet rotates through the optical axis 190, the center of the circle 230 also rotates about the rotational axis 225A. The resulting scan line follows the motion of the lens, tracing out an arc 240A as shown in FIG. 2C. The sag of the arc is the bow of this scan line.

This bow can be reduced, or even eliminated, as follows. If the scan component on scan disk 220B is also a lens with negative optical power, it will trace the arc 240B. But this arc is bowed in the opposite direction as arc 240A. The two bows counteract each other, resulting in a net scan line 245 that scans faster and is longer and with less bow. In some cases, the bow can be entirely eliminated. For example, this will be the case if the scan disks 220A-B are in close proximity to each other so that propagation between the scan disks has negligible effect, the distance from the optical axis 190 to each rotational axis 225 is the same, and both scan components are lenses with the same optical power located in the same relative position on their respective facets. In cases where the scan disks 220 are spaced apart, bow correction can be achieved by small differences in the optical power of the two scan components.

In addition, the scan components can be designed differently for each set of corresponding facets. For example, different facets can use lenses of different powers, which results in different length scan lines. As another example, in many cases, it may be desirable for the scan components to be the same for each set of facets, but some other aspect of the facets may vary. In one approach, facets may include an offset component in addition to a scan component. The offset component offsets the entire scan line in a direction perpendicular to the scan direction. Thus, if different facets have the same scan component but different offset components, the resulting scan lines will be approximately the same length but will be offset from one another in the orthogonal direction. For example, see U.S. patent application Ser. No. 10/750,790, "High Speed, High Efficiency Optical Pattern Generator Using Rotating Optical Elements," filed Dec. 31, 2003 by Leonard C. DeBenedictis et al., which is incorporated herein by reference. The use of offset components can produce a two-dimensional scan without requirement a second scan mechanism such as a galvanometer mirror. The resulting two-dimensional scanner can be quite compact and efficient.

The term "scan component" is distinguished from "facet" because the scan component may or may not be implemented as a physically distinct component. For example, the scan component can be a lens that is attached to one side of the optical element 220 with a separate offset component attached to the reverse side. Alternately, it may be integrated into a single component. For example, a general asphere may be used, with the asphere implementing both the scanning and the offset functions. It may also implement additional functions, such as aberration correction.

One advantage of the counter-rotating disk scanner is its speed. Disks can be rotated at very high speeds. For example, if a scan disk contains 30 facets and rotates at a speed of 10,000 rpm, then the system will generate 5,000 scans per second for a single beam source. If the source produces an array of N optical beams, then 5,000N scans per second will be generated. Furthermore, the speed can be varied. In one approach, the scan disks are driven by motors. The drive shafts or the disks themselves are encoded and the feedback is used to both control the speed of the disks and to synchronize the disks with each other, with the other scan mechanism 130 and/or with other components in the system (e.g., the feed for a video signal or timing control for a detector).

As further variations, the examples shown above use transmissive facets but reflective or hybrid designs can also be used. The scan components can also be based on refraction, reflection, diffraction or a combination of these. Mirrors, conventional lenses, aspheres, Fresnel lenses, kinoforms, diffractive and holographic optics are examples of possible physical implementations. The term "lens-like optical element" will be used to refer to refractive lenses, curved mirrors, holographic lenses and other optical elements that are counterparts to refractive lenses.

Figure 3:
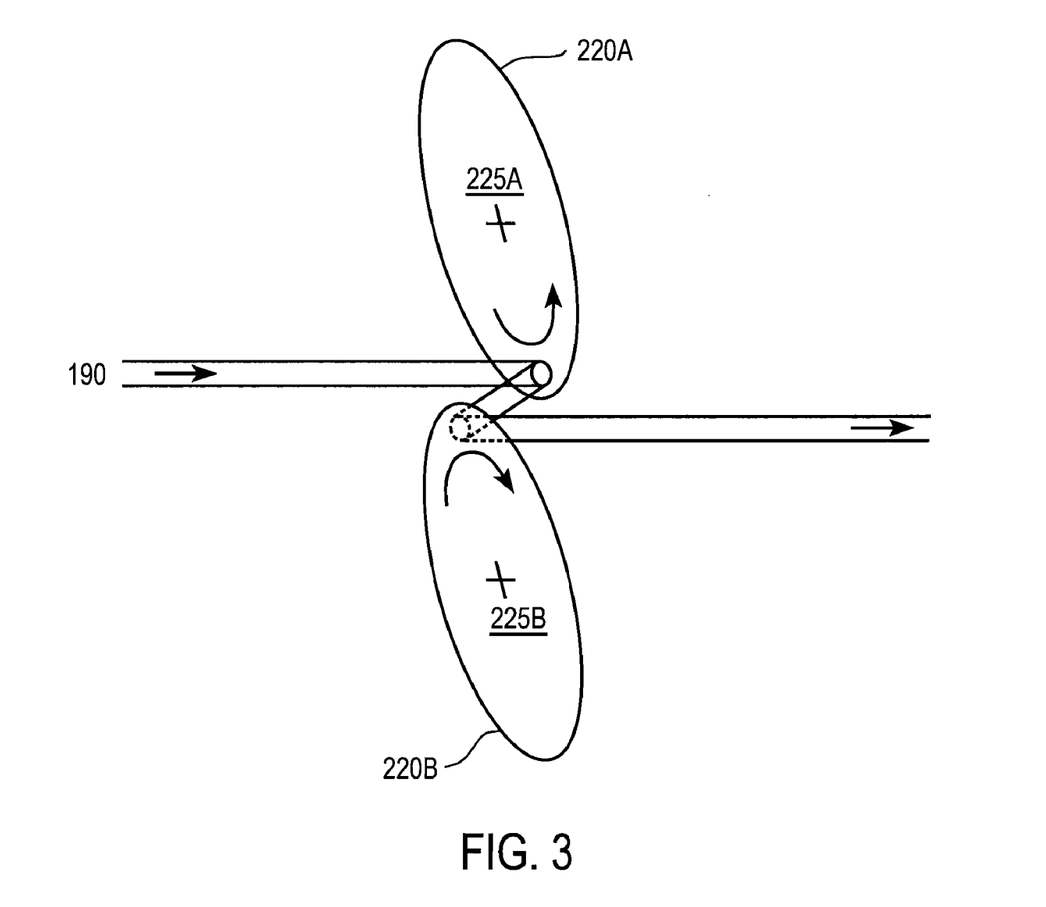
FIG. 3 is a perspective view of a reflective counter-rotating disk scanner.

FIG. 3 illustrates a reflective design. In this example, two reflective counter-rotating scan disks 220A-220B are tilted relative to normal. The optical axis 190 is reflected by the first scan disk 220A onto the second scan disk 220B. Both scan disks 220 also introduce deflections that generate the scanning motion. The second scan disk 220B introduces a second deflection, with counteracting bow.

Figure 4:
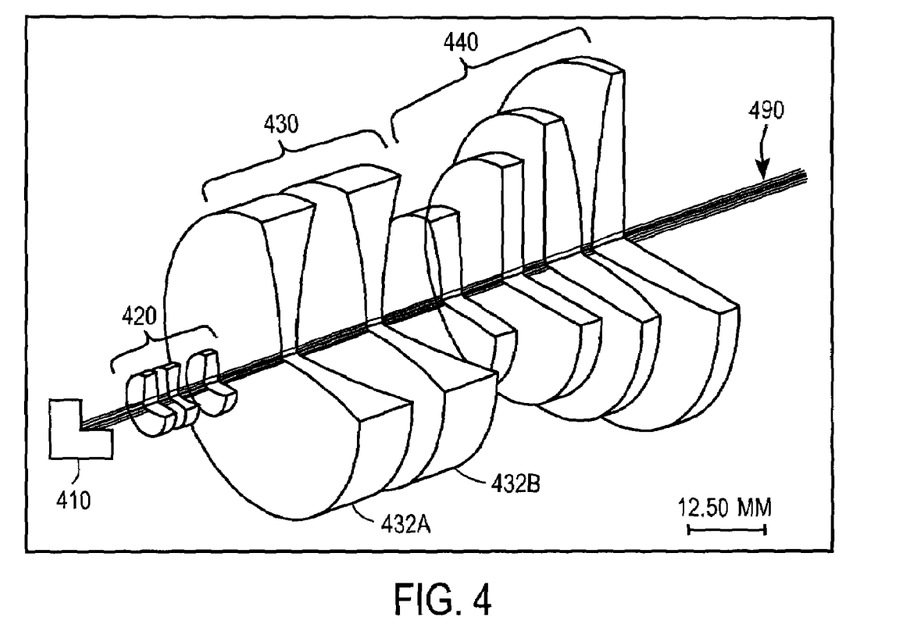
FIG. 4 is a perspective view of a display system using a galvanometer scanner and a counter-rotating disk scanner.
Figure 5:
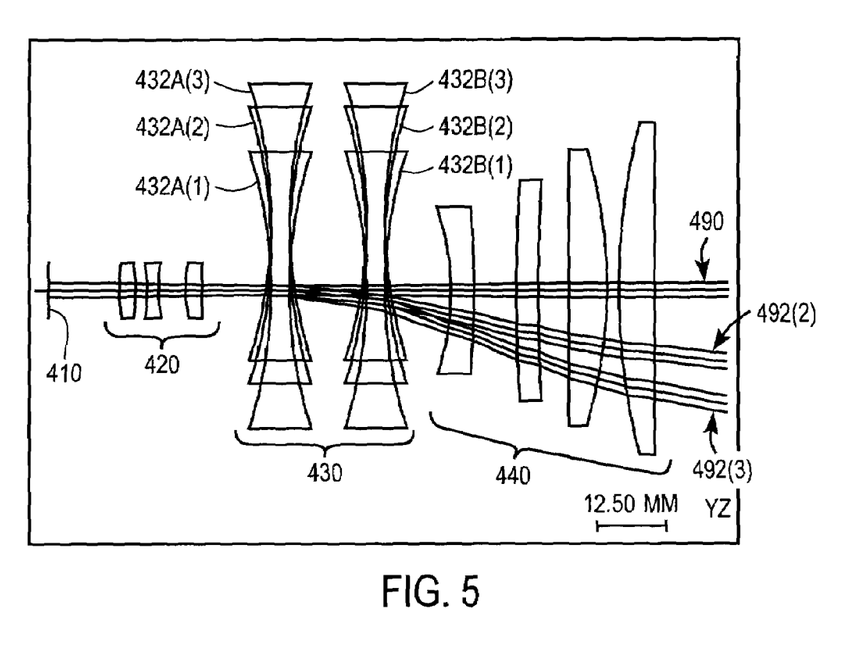
FIG. 5 is a composite cross-sectional view of the scan system of FIG. 4, illustrating scanning by the disk scanner.
Figure 6:
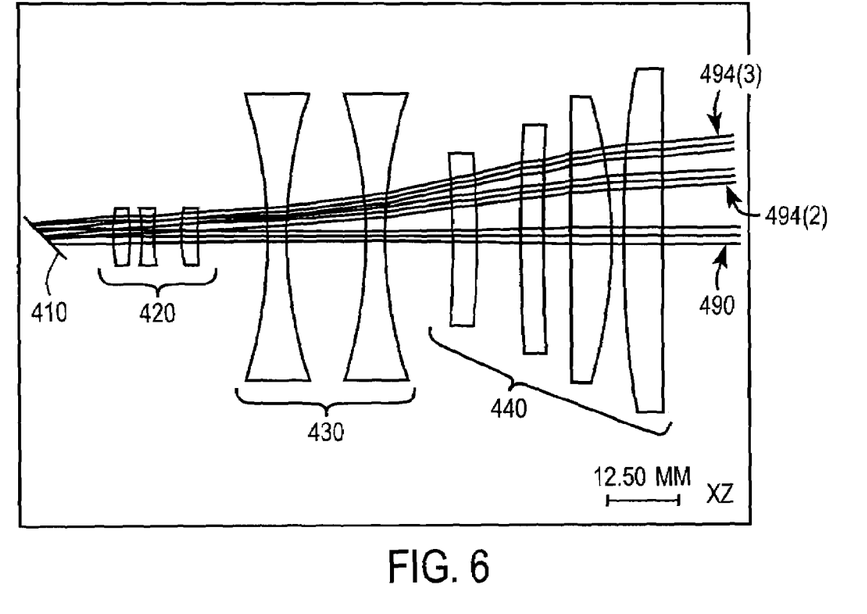
FIG. 6 is a composite cross-sectional view of the scan system of FIG. 4, illustrating scanning by the galvanometer scanner.

FIGS. 4-6 show an example of a large format, high resolution HDTV-class display system based on a dual-disk scanner. The optical train for this example includes a galvanometer scanner 410, a pre-scanner lens group 420, a counter-rotating dual-disk scanner 430 and a post-scan imaging lens group 440. For clarity, only one facet 432A-432B from each of the scan disks is shown in FIGS. 4-6.

The dual-disk scanner 430 produces the fast scan, which typically would be a horizontal line scan for most current displays. The galvanometer scanner 410 produces the slow scan, which typically would be the vertical field scan. In other words, the rotation of one pair of corresponding facets 432 through the incident optical beam will generate one scan line. In that time, the galvanometer scanner 410 introduces the appropriate vertical field offset to generate the next scan line.

FIG. 4 shows a single ray bundle 490 when both the galvanometer scanner 410 and the dual-disk scanner 430 are in their "neutral" position (i.e., center of the scan lines). FIG. 5 is a cross-sectional view that illustrates scanning in the Y direction (the optical axis is along the Z direction) by the dual-disk scanner 430. This figure shows three different positions for the pair of scan components 432—neutral position (center of the scan) 432A-B(1), partway through the scan 432A-B(2), and the edge of the scan 432A-B(3)—and the corresponding ray bundles 490, 492 (2) and 492(3). This illustrates one half of the fast scan generated by the dual-disk scanner 430. Similarly, FIG. 6 is a cross-sectional view that illustrates three scan positions for the galvanometer scanner 410 and the corresponding ray bundles 490, 494(2) and 494 (3). This illustrates one half of the slow scan in the X direction generated by the galvanometer scanner 410.

In more detail, the scan components for the facets 432 in this design are lenses with negative optical power. Because these negatively powered elements will cause an incident collimated beam to diverge, the pre-scanner optics 420 upstream of the dual-disk scanner introduce a corresponding amount of positive optical power. A collimated beam is converged by the pre-scanner optics 420 and then diverged by the facets 432. The beam is collimated when it exits the dual-disk scanner 430 and is directed to the post-scan imaging lens group 440.

The post-scan imaging lens group 440 is typically of the "F-θ" design class frequently used for laser line scanners. The "F-θ" post-scan lens group 440 has the property that the image is linearly mapped as a function of the deviated beam scan angle and the scanned line image moves nearly constantly as a function of scanner rotation angle. Small variances in scan linearity can be corrected electronically (e.g., by predistorting the image to be displayed) since at least one frame of data is typically stored before scanning.

The three element pre-scanner group 420 is designed to accept collimated input beams that are inclined at moderate angles to the optical axis of this group, due to the scanning of the galvanometer scanner 410 and possibly also due to the use of multiple optical beams as described below. Accordingly, this group 420 corrects for oblique aberration of the input beams (primarily coma aberration). It is also corrected for chromatic aberration. The pre-scanner optics 420 also corrects for the aberrations (including chromatic aberrations) of the two facets 432 when they are in their neutral rotational position 432A-B(1).

Because the scanner facets move through the optical path and therefore introduce decentered optical surfaces to the optical path, there is also a dynamic (changing with rotation angle or with scan time) astigmatism. This dynamic astigmatism can be corrected through the use of aspheric surfaces on the facets 432. For example, the facets can be injected molded plastic. The dynamic astigmatism can be corrected while keeping the corresponding facets identical so they can be produced by a single molding tool.

The rotation of the facets through the optical path also introduces a dynamic lateral chromatic aberration (chromatic aberration that changes with rotation angle of the scan disks). This aberration can be corrected by the choice of materials in the post-scan imaging lens group 440.

FIGS. 4-6 show only a single incident optical beam but alternate embodiments can use an array of optical beams. For example, the use of N vertically arrayed light sources upstream of the galvanometer scanner 410 could produce N simultaneous scan lines for each set of facets. This can increase screen brightness and/or reduce vertical scan velocities. It could also be used to permit simultaneous scanning of Red, Green, and Blue color components, for example by simultaneously scanning Red, Green and Blue optical beams.

Figure 7:
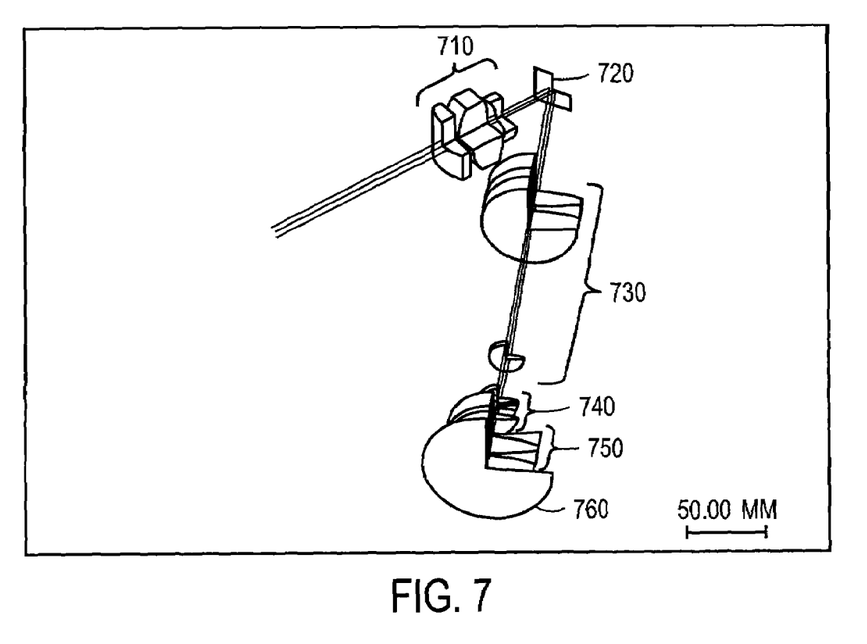
FIG. 7 is a perspective view of a display system using a polygon scanner and a counter-rotating disk scanner.
Figure 8:
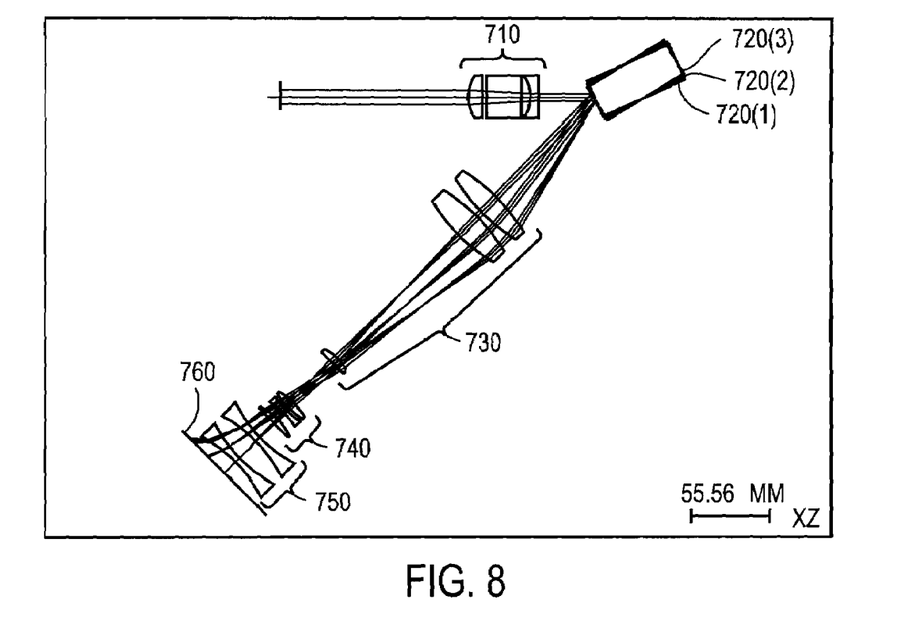
FIG. 8 is a composite cross-sectional view of the scan system of FIG. 7, illustrating scanning by the polygon scanner.
Figure 9:
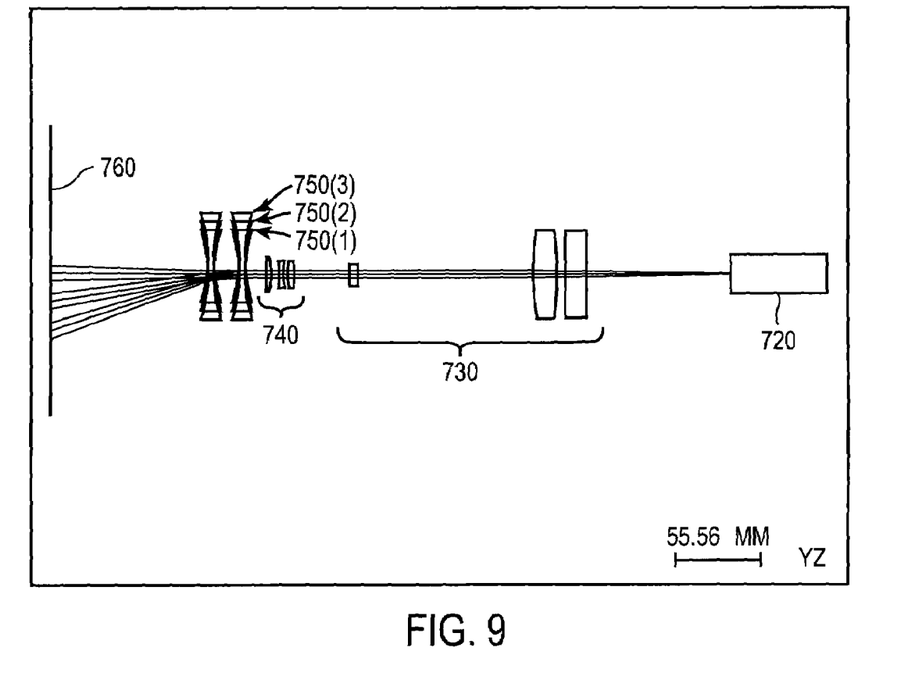
FIG. 9 is a composite cross-sectional view of the scan system of FIG. 7, illustrating scanning by the counter-rotating disk scanner.

FIGS. 7-9 show another example of a HDTV-class display based on a dual-disk scanner. The optical train includes anamorphic optics 710, a polygon scanner 720, a relay lens group 730, a pre-scanner lens group 740, a dual-disk scanner 750 and a post-scan imaging lens group 760. Only the current facet of the polygon scanner and the scan disks are shown for clarity. In this example, the dual-disk scanner 750 produces the slow scan (e.g., vertical field scan) and the polygon scanner 720 produces the fast scan (e.g., horizontal line scan).

FIG. 7 shows a single optical beam 790 when both the polygon scanner 720 and the dual-disk scanner 750 are in their neutral position. FIG. 8 illustrates fast scanning by the polygon scanner 720 along the X direction and FIG. 9 illustrates slow scanning by the dual-disk scanner 750 along the Y direction. The Z direction is along the optical axis.

The anamorphic optics 710 is used to reduce line jitter caused by pyramidal facet errors and bearing wobble in the polygon scanner. A collimated input beam is incident on the anamorphic optics 710, which brings the optical beam to a line focus on the polygon scanner 720. The line focus is in the plane of the paper in FIG. 8. In other words, the optical beam is focused in the non-scanning direction for the polygon scanner and is collimated in the scanning direction. The anamorphic relay lens group 730 images the focused spot in the non-scan direction onto the image surface and simultaneously images the collimated beam in the scan direction onto the same image surface at the same magnification. Cylindrical lens surfaces are combined with spherical lens surfaces in both the input lens group 710 and the output lens group 730. Jitter effects are significantly reduced with this design because the pyramidal error and bearing wobble of the polygon scanner do not affect the position of the focused line on the facet surface and it is this fixed spatial location that is relayed by the output lens group 730 onto the image surface.

In this particular example, the input lens group 710 includes three elements: a positive cylindrical-plano element, a positive bi-cylindrical element with the cylinder axis orthogonal to the first element and a negative spherical element. The output lens group 730 also includes three elements: a bi-concave negative cylindrical element, a positive spherical element and a plano-cylindrical element. After passing through the output lens group 730, the optical beam is collimated in both directions but is angularly scanning in the horizontal plane, as shown in FIG. 8.

This beam next passes through the dual-disk scanning system, which includes the pre-scanner optics 740 and the dual-disk scanner 750. The pre-scanner optics 740 plays a similar role to the pre-scanner optics 420 in FIG. 4. It conditions the optical beam for the dual-disk scanner 750 and corrects for non-dynamic aberrations introduced by the dual-disk scanner.

The final focusing lens group 760 is shown as a single line in FIGS. 7-9. This line represents one of many design forms that can be selected on the basis of final image dimension constraints such as numerical aperture and field angle. However, the final focusing lens group 760 preferably will incorporate materials and surfaces to correct for dynamic lateral chromatic aberration that is introduced by the rotating facets 750.

Two-dimensional optical scan systems were described above using specific examples. This was done for purposes of clarity and the invention is not limited to these examples. For example, it is not limited to either a single optical beam or to the same facet replicated over the entire scan disk. Each scan disk 220 contains multiple facets and each set of corresponding facets can be designed to produce different scanning motions. In addition, the bow correction described above need not be used with every facet. In some applications or for some facets, the undesirable effects introduced by conventional bow may be tolerable so that bow correction is not necessary. At the other extreme, in some applications, every facet may utilize the bow correction described above.

The physical implementations of facets can also vary. For facets that include a separate scan component and some other component (e.g., an offset component), different designs can place these components in different orders within the optical train (e.g., on different sides of the scan disk). The scan component and other component can also be integrated into a single optical component. For example, aberration correction can be integrated with the lens-based scan component and implemented as an aspheric surface. In addition, although it is usually desirable for the optical beams entering and/or exiting the counter-rotating disk scanner to be collimated, that is not a requirement.

Accordingly, although the description above contains many specifics, these should not be construed as limiting the scope of the invention but merely as illustrating different examples and aspects of the invention. For example, applications other than displays and scanned imaging systems will be apparent. Some examples include industrial pattern generation and printing, including printing documents and labels, or UV image printing on consumer products. The specific design of the two-dimensional optical scan system and also the counter-rotating disk scanner will depend on the application. For example, the wavelength of the optical beams will depend in part on the application. Terms such as "optical" and "light" are not meant to be limited to just the visible range of the spectrum.

Depending on the application, the two-dimensional scan pattern can also take different forms. In many applications, a continuous scan line (or series of scan lines) is traced repeatedly but offset by some amount on each trace. The scan lines can also be a series of points rather than a continuous line, for example if the optical source is pulsed on and off during scanning or if secondary counter-scanners are used to compress dashes within a scan line into a dot. For example, see FIG. 7B and the corresponding text of U.S. patent application Ser. No. 10/750,790, "High Speed, High Efficiency Optical Pattern Generator Using Rotating Optical Elements," filed Dec. 31, 2003 by Leonard C. DeBenedictis et al, which is incorporated herein by reference. Other variations will be apparent.

As another example of different variations, the number of scan disks 220 can also vary. The above examples all use a pair of scan disks but this is not a requirement. Two or more pairs of rotating optical elements can be used. Alternately, the two-disk designs can be converted to three-disk designs by "splitting" one of the scan disks into two scan disks. In FIG. 4, the negative lens 432A can be split into two negative lenses with half the power, one placed upstream of the negative lens 432B and the other placed downstream of the negative lens 432B.

What is claimed is:

1. A two-dimensional optical scan system for scanning light propagating along an optical axis of the scan system, the scan system comprising:
   a counter-rotating disk scanner comprising at least two disks for scanning the optical axis along a first direction; and
   a scan mechanism optically coupled with the counter-rotating disk scanner for scanning the optical axis along a second direction that is cross to the first direction.

2. The scan system of claim 1 wherein the counter-rotating disk scanner comprises:
   a first scan disk and a second scan disk wherein the first and second scan disks counter-rotate.

3. The scan system of claim 2 wherein:
   the rotational axes of the two scan disks are offset from each other;
   the optical axis is incident on the scan disks at a point located between the two rotational axes; and
   the first direction is approximately parallel to the tangential direction of the scan disks.

4. The scan system of claim 1 further comprising:
   an optical source for generating an optical beam along the optical axis.

5. The scan system of claim 4 wherein the optical source generates multiple optical beams.

6. The scan system of claim 5 wherein the optical source generates multiple optical beams for simultaneously displaying multiple scan lines.

7. The scan system of claim 1 wherein the scan mechanism comprises:
   either a piezo-electric scanner or a galvanometer-based scanner.

8. The scan system of claim 1 wherein the scan mechanism comprises:
   a polygon scanner.

9. The scan system of claim 1 wherein the scan mechanism comprises:
   a second counter-rotating disk scanner.

10. The scan system of claim 1 wherein the first direction is a fast scan direction and the second direction is a slow scan direction.

11. The scan system of claim 1 wherein the first direction is a slow scan direction and the second direction is a fast scan direction.

12. The scan system of claim 1 wherein the counter-rotating disk scanner is a reflective counter-rotating disk scanner.

13. The scan system of claim 1 further comprising:
   a pre-scanner lens group located between the scan mechanism and the disk scanner; and
   a post-scan imaging lens group located downstream of the disk scanner.

14. The scan system of claim 1 further comprising:
   an imaging lens group located downstream of the disk scanner for projecting an image to be displayed.

15. The scan system of claim 14 wherein the imaging lens group corrects for dynamic chromatic aberration introduced by rotation of the disk scanner.

16. The scan system of claim 1 further comprising:
   an f-theta lens group located downstream of the disk scanner and downstream of the scan mechanism.

17. The scan system of claim 1 further comprising:
   a pre-scanner lens group located downstream of the disk scanner for compensating for optical power introduced by the disk scanner and further for correcting monochromatic aberrations introduced by the disk scanner in a neutral rotational position.

18. The scan system of claim 1 wherein the disk scanner includes aspheric surfaces that correct for dynamic off-axis aberrations introduced by rotation of the disk scanner.

19. The scan system of claim 1 further comprising:
   an imaging lens group located upstream of the disk scanner for correcting dynamic chromatic aberration introduced by rotation of the disk scanner.

20. A two-dimensional optical scan system for scanning light propagating along an optical axis of the scan system, the system comprising:
   a first scanning means for scanning the optical axis along a first direction, the first scanning means comprising at least two counter-rotating disks; and
   a second scanning means for scanning the optical axis along a second direction that is cross to the first direction, wherein the second scanning means is optically coupled with the first scanning means.

21. The scan system of claim 20 wherein the first scanning means comprises:
   a first scan disk and a second scan disk wherein the first and second scan disks counter-rotate.

22. The scan system of claim 21 wherein:
   the rotational axes of the two scan disks are offset from each other;
   the optical axis is incident on the scan disks at a point located between the two rotational axes; and
   the first direction is approximately parallel to the tangential direction of the scan disks.

* * * * *

UNITED STATES PATENT AND TRADEMARK OFFICE
CERTIFICATE OF CORRECTION

PATENT NO. : 7,486,426 B2 Page 1 of 1
APPLICATION NO. : 11/691291
DATED : February 3, 2009
INVENTOR(S) : Barry G. Broome et al.

It is certified that error appears in the above-identified patent and that said Letters Patent is hereby corrected as shown below:

Front Page, item (57), line 2, after the word "optical", please delete "scanner".

Front Page, item (57), line 2, after the word "optical", please insert -- scanning --.

Signed and Sealed this

Fifth Day of May, 2009

JOHN DOLL
*Acting Director of the United States Patent and Trademark Office*